(12) United States Patent
Fredlund et al.

(10) Patent No.: US 9,462,181 B2
(45) Date of Patent: *Oct. 4, 2016

(54) IMAGING DEVICE FOR CAPTURING SELF-PORTRAIT IMAGES

(71) Applicant: Intellectual Ventures Fund 83 LLC, Las Vegas, NV (US)

(72) Inventors: John R. Fredlund, Rochester, NY (US); Kenneth A. Parulski, Rochester, NY (US); Robert M. Guidash, Rochester, NY (US); Kevin E. Spaulding, Spencerport, NY (US); Frank Razavi, Fairport, NY (US)

(73) Assignee: INTELLECTUAL VENTURES FUND 83 LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/584,175

(22) Filed: Dec. 29, 2014

(65) Prior Publication Data

US 2015/0116503 A1    Apr. 30, 2015

Related U.S. Application Data

(63) Continuation of application No. 12/716,304, filed on Mar. 3, 2010, now Pat. No. 8,957,981.

(51) Int. Cl.
*H04N 5/228*        (2006.01)
*G03B 17/00*        (2006.01)
(Continued)

(52) U.S. Cl.
CPC ......... *H04N 5/23219* (2013.01); *G01S 3/7864* (2013.01); *H04N 1/0049* (2013.01);
(Continued)

(58) Field of Classification Search
CPC ............. H04N 5/232; H04N 2101/00; H04N 2201/0084; H04N 5/23248; H04N 5/772; G03B 17/425; G03B 17/38; G03B 17/00; G03B 15/00; G03B 7/0805
USPC ........... 348/207.99, 333.01; 396/48, 59, 264, 396/286, 472
See application file for complete search history.

(56) References Cited

U.S. PATENT DOCUMENTS 3,971,065 A    7/1976    Bayer
4,642,678 A    2/1987    Cok
(Continued)

FOREIGN PATENT DOCUMENTS

CN    101370087    2/2009
EP    2 146 242    1/2010
(Continued)

OTHER PUBLICATIONS

Final Office Action on U.S. Appl. No. 12/716,304, mailed Oct. 10, 2013.
(Continued)

*Primary Examiner* — Sinh Tran
*Assistant Examiner* — Selam T Gebriel

(57) ABSTRACT

A digital camera for capturing an image containing the photographer, comprising: an image sensor; an optical system for forming an image of a scene on the image sensor; a processor for processing the output of the image sensor in order to detect the presence of one or more faces in a field of view of the digital camera; a feedback mechanism for providing feedback to the photographer while the photographer is included within the field of view, responsive to detecting at least one face in the field of view, and a means for initiating capture of a digital image of the scene containing the photographer.

20 Claims, 8 Drawing Sheets

(51) Int. Cl.
  *H04N 5/232* (2006.01)
  *G01S 3/786* (2006.01)
  *H04N 1/00* (2006.01)
  *H04N 101/00* (2006.01)

(52) U.S. Cl.
  CPC ...... *H04N1/00488* (2013.01); *H04N 1/00514* (2013.01); *H04N 5/232* (2013.01); *H04N 1/0035* (2013.01); *H04N 2101/00* (2013.01)

(56) References Cited

U.S. PATENT DOCUMENTS

| | | |
|---|---|---|
| 4,774,574 A | 9/1988 | Daly et al. |
| 5,189,511 A | 2/1993 | Parulski et al. |
| 5,493,335 A | 2/1996 | Parulski et al. |
| 5,541,703 A | 7/1996 | Suzuka |
| 5,565,947 A | 10/1996 | Chamberlain, IV |
| 5,652,621 A | 7/1997 | Adams et al. |
| 5,668,597 A | 9/1997 | Parulski et al. |
| 6,101,336 A | 8/2000 | Nonaka |
| 6,192,162 B1 | 2/2001 | Hamilton et al. |
| 6,292,218 B1 | 9/2001 | Parulski et al. |
| 6,934,056 B2 | 8/2005 | Gindele et al. |
| 7,574,128 B2 | 8/2009 | Matsuda |
| 7,583,294 B2 | 9/2009 | Ray et al. |
| 7,660,445 B2 | 2/2010 | Ray |
| 7,817,915 B2 | 10/2010 | Sugimoto |
| 8,004,573 B2 | 8/2011 | Watanabe |
| 8,116,539 B2 | 2/2012 | Nishijima |
| 8,199,209 B2 | 6/2012 | Ono |
| 2004/0218916 A1 | 11/2004 | Yamaguchi et al. |
| 2005/0122401 A1 | 6/2005 | Horie |
| 2005/0191729 A1 | 9/2005 | Kaczmarek et al. |
| 2006/0197845 A1 | 9/2006 | Masaki |
| 2006/0237626 A1 | 10/2006 | Sakai et al. |
| 2007/0274703 A1 | 11/2007 | Matsuda |
| 2008/0025710 A1 | 1/2008 | Sugimoto |
| 2008/0122943 A1 | 5/2008 | Itoh |
| 2008/0239104 A1 | 10/2008 | Koh |
| 2008/0273097 A1 | 11/2008 | Nagashima |
| 2009/0060274 A1 | 3/2009 | Kita |
| 2009/0087039 A1 | 4/2009 | Matsuura |
| 2009/0237521 A1 | 9/2009 | Nishijima |
| 2010/0013945 A1 | 1/2010 | Hada |
| 2010/0026830 A1 | 2/2010 | Kim |
| 2010/0149398 A1* | 6/2010 | Gayer ................... 348/333.01 |
| 2010/0158491 A1 | 6/2010 | Sugimoto |
| 2010/0225773 A1 | 9/2010 | Lee |
| 2010/0266206 A1 | 10/2010 | Jo et al. |
| 2010/0302393 A1 | 12/2010 | Olsson et al. |
| 2011/0008036 A1 | 1/2011 | Takatsuka et al. |
| 2011/0025854 A1 | 2/2011 | Yoshizumi |
| 2011/0080489 A1 | 4/2011 | Chen et al. |

FOREIGN PATENT DOCUMENTS

| | | |
|---|---|---|
| EP | 2 448 221 | 5/2012 |
| JP | 2008-067003 | 3/2008 |
| JP | 2008-118276 | 5/2008 |
| JP | 2008-283258 | 11/2008 |
| JP | 2009-033544 | 2/2009 |
| JP | 2009-038750 | 2/2009 |
| JP | 2009-065577 | 3/2009 |
| WO | WO-2009/064086 | 5/2009 |

OTHER PUBLICATIONS

Final Office Action on U.S. Appl. No. 12/716,304, mailed Oct. 17, 2012.
Fujifilm; FinePix Z33WP: Features—New SR ATO & Face Detection; pp. 1-5 http://www.fujifilmusa.com/products/digital._cameras/z/finepix._z33wp/features/page_02.html.
Non-Final Office Action on U.S. Appl. No. 12/716,304, mailed Mar. 14, 2012.
Non-Final Office Action on U.S. Appl. No. 12/716,304, mailed Mar. 18, 2014.
Non-Final Office Action on U.S. Appl. No. 12/716,304, mailed Apr. 1, 2013.
Notice of Allowance on U.S. Appl. No. 12/716,304, mailed Oct. 9, 2014.
Office Action on Japanese Application 2012-556093, mailed Jan. 6, 2015.
PowerShot SX210 IS, Camera User Guide; pp. 61-62 http://www.macworld.com/article/146894/2010/03/camons_wink_detection.html.
Search Report on EP Application 11706981.5, mailed Nov. 22, 2013.

* cited by examiner

IMAGING DEVICE FOR CAPTURING SELF-PORTRAIT IMAGES

CROSS-REFERENCE TO RELATED PATENT APPLICATIONS

This application is a Continuation of U.S. application Ser. No. 12/716,304, filed Mar. 3, 2010, incorporated herein by reference in its entirety.

FIELD

This disclosure pertains to the field of capturing digital images with a portable digital capture device, and more particularly to a digital capture device having modes providing improved usability when held at arm's length to capture images containing the user.

BACKGROUND

Digital cameras have become very common and have largely replaced traditional film cameras. Today, most digital cameras incorporate an image display screen on the back of the camera. The display screen enables images to be composed as they are being captured, and provides user interface elements for adjusting camera settings. The display screen is also used to browse through images that have been captured and are stored in the digital camera's memory. However, due to the position of the display on the back of the camera, the user does not receive any visual feedback when the user wishes to be in the field of capture of the camera.

A user often desires to capture a photo of himself at a particular venue. This can be accomplished by holding the camera at arm's length and guessing if the camera is pointed in such a manner that the user's face will be in the captured image. This is difficult for many users, and multiple captures are often made to provide a single acceptable one.

Another technique is to use the timer mode of the camera. This requires that the camera be placed on a tripod or rigid surface, and the user must scurry from the camera to the field of capture within the time allotted. Most users are unwilling to carry a tripod, and often finding a good surface for placement of the camera is difficult. Additionally, the camera may move when the shutter button is pressed, and since there is no verification that the user is in the field of view of the camera, the image may need to be captured multiple times for the user to be properly captured. There is also the issue of allowing the camera to be placed at a distance from the user when the image is captured. This may be undesirable in crowded venues where theft is a possibility.

At times, other people may offer or be solicited to capture the image of the user. In addition to concerns about theft, the lack of control over image capture abilities and techniques of the other person may produce images that are not acceptable to the user.

Cameras sometimes incorporate mirrors to provide visual feedback. However, these can be difficult to see due to small size, or may be inconveniently located. These mirrors also add material and assembly cost, and cannot provide proper results when optical or digital zooming is used. The Palm Pre cell phone has such a mirror that can be deployed by sliding the backward facing display upward.

Cameras can also use a framing apparatus, as described in commonly assigned U.S. Pat. No. 5,565,947. This patent describes how a plurality of thin elements can be arrayed on the front surface of the camera around the lens in general correspondence with the field of view. Framing accuracy is improved for self portraits by canting each element outwardly from the optical axis at such an angle that an inside surface of every element is visible to a subject positioned within the field of view of the lens. Like mirrors, this thin framing element also add material and assembly cost, and cannot provide proper results when optical or digital zooming is used.

Some cameras, such as the Samsung DualView TL220, have provided an additional display on the front of the camera that the user can view while composing the image. While this is an improvement, it adds significant cost to the camera due to the need to incorporate two displays. Additionally, the image is small and can be difficult to see.

Some cameras, such as the Casio EX-P505, have an articulating display that can be repositioned such that the user can view the scene that is being captured. Unfortunately, arrangements of this type add significant cost and, are also fragile since the display is not safely contained within the confines of the camera body.

There remains a need for a cost effective and user-friendly method for improving the ability for a user to compose and capture a self portrait while holding a camera.

SUMMARY

The present invention represents a digital camera for capturing an image containing the photographer, comprising:

an image sensor;

an optical system for forming an image of a scene on the image sensor;

a processor for processing the output of the image sensor in order to detect the presence of one or more faces in a field of view of the digital camera;

a feedback mechanism for providing feedback to the photographer while the photographer is included within the field of view, responsive to detecting at least one face in the field of view, and a means for initiating capture of a digital image of the scene containing the photographer.

whether the camera is correctly oriented when it is held at arms length for capturing an image containing the photographer.

It has the additional advantage that it is lower in cost and complexity than alternate solutions which require a second display, or a repositionable display.

It has the further advantage that the photographer can maintain possession of the camera during the process of capturing an image containing the photographer, thus providing added protection against theft and greater control over the photographic process.

Figure 1:
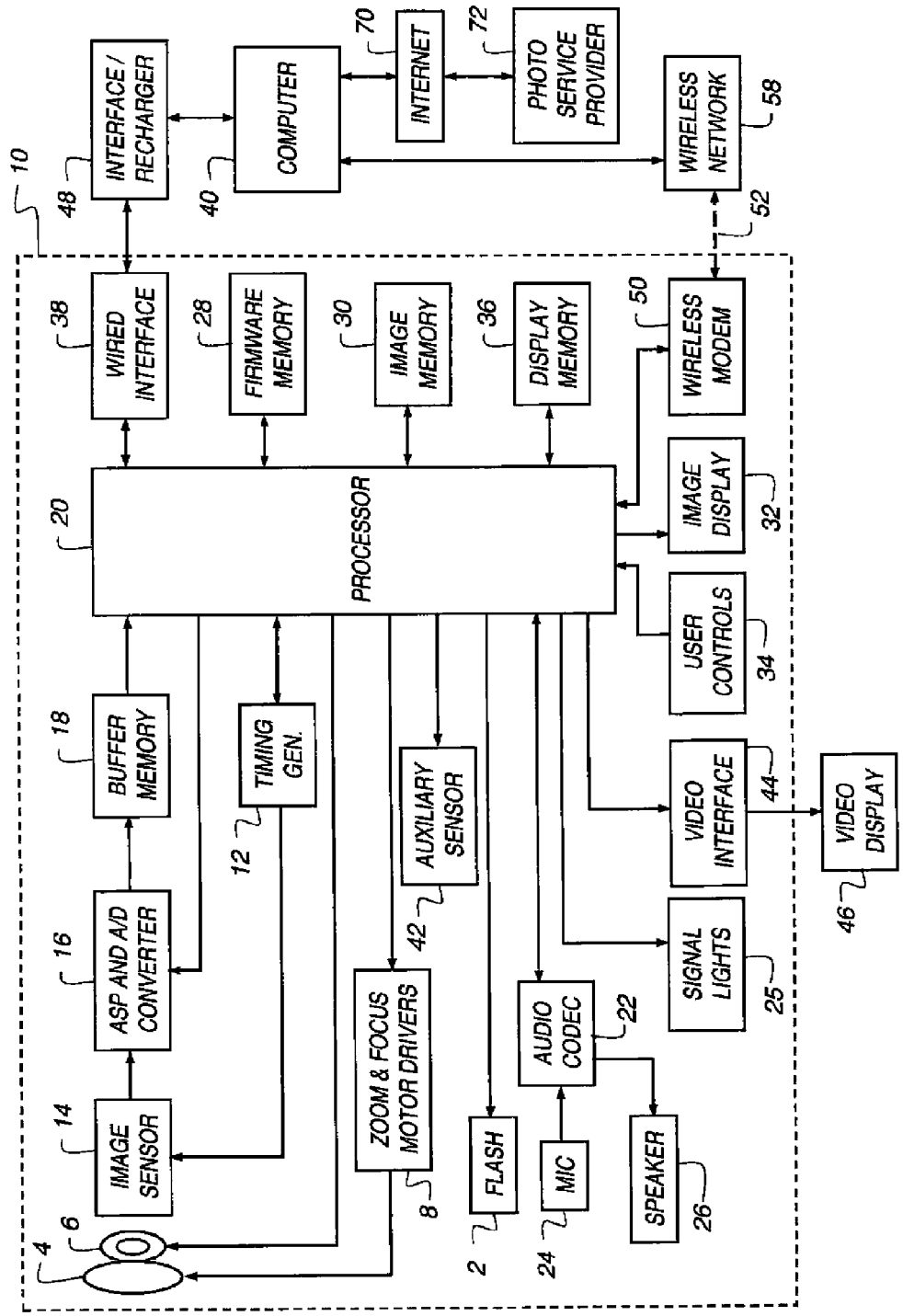
FIG. 1 is a high-level diagram showing the components of a digital camera system.

It is to be understood that the attached drawings are for purposes of illustrating the concepts of the invention and may not be to scale.

DETAILED DESCRIPTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The disclosure is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned US patent application number U.S. Patent Application Publication 2007/0024931, filed on Jul. 28, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the digital processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

An optional auxiliary sensor 42 can be used to sense information about the scene or the viewing environment. For example, the auxiliary sensor 42 can be a light sensor for measuring an illumination level of the scene in order to set the proper exposure level. Alternatively, the auxiliary sensor 42 can be an environmental sensor used to characterize the viewing environment in which images are being viewed on an image display 32. Those skilled in the art will recognize that many other types of auxiliary sensors 42 can also be used.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the color LCD image display 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button (e.g., image capture button 240 shown in FIG. 4), which is one of the user controls 34, and the second mode (i.e., still image capture mode) is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used.

The camera modes that can be selected using the user controls 34 include a "self portrait" mode, which will be described later with respect to FIG. 4, and a "timer" mode. When the "timer" mode is selected, a short delay (e.g., 10 seconds) occurs after the user fully presses the shutter button, before the processor 20 initiates the capture of a still image.

One or more signal lights 25 on the digital camera 10 can be used to provide visual feedback to the user when a self-portrait is being captured, as will be described later with respect to FIG. 4.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected, or to provide feedback to the user when a self-portrait is being captured. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
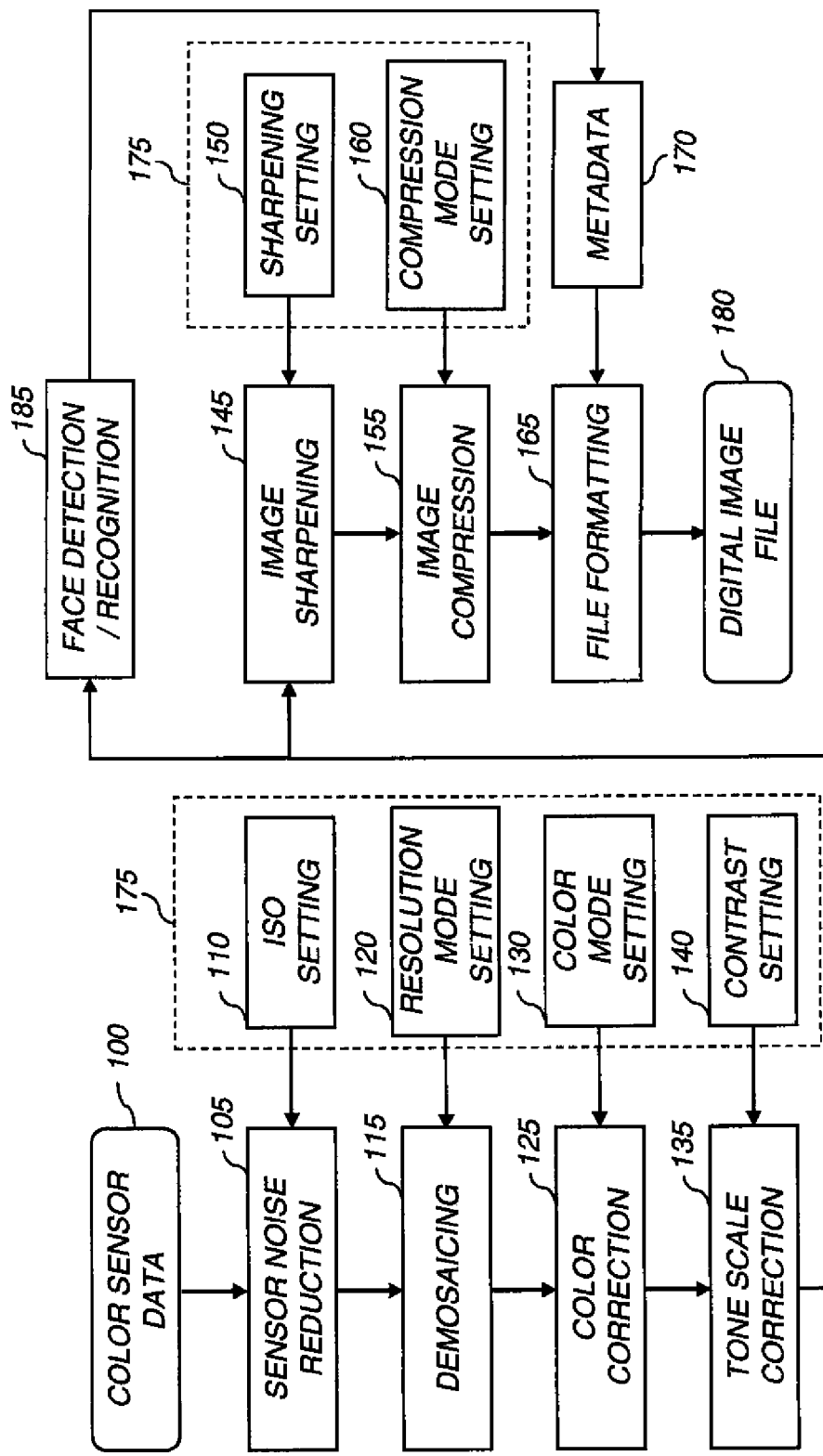
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which can be selected via the user controls 34 in response to menus displayed on the image display 32.

The color sensor data 100 which has been digitally converted by the ASP and A/D converter 16 is manipulated by a sensor noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750× 500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by a face detection/recognition step 185. In some embodiments, face detection can be provided using the methods described in commonly-assigned U.S. Pat. No. 7,583,294, entitled "Face detecting camera and method" to Ray, et al, the disclosure of which is incorporated herein by reference. This patent teaches a method for determining the presence of a face from image data that utilizes a first algorithm to prescreen the image data, by determining a plurality of face candidates utilizing a pattern matching technique that identifies image windows likely to contain faces based on color and shape information, and a second algorithm that processes the face candidates determined by the first algorithm, and uses a posterior probability function classifier to determine the presence of the face. The output of the face detection/recognition step 185 can include metadata that identifies the location of any faces that are detected.

In some embodiments, the face detection/recognition step 185 can recognize specific faces in images, as described in commonly-assigned U.S. Pat. No. 7,660,445 to Ray, entitled "Method for selecting an emphasis image from an image collection based upon content recognition," the disclosure of which is incorporated herein by reference. For example, the face recognition step 175 could be used to recognize the face of the user of the digital camera 10. The output of step 175 can include metadata that identifies the names or other identifiers for specific faces that are detected.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format.

Figure 3:
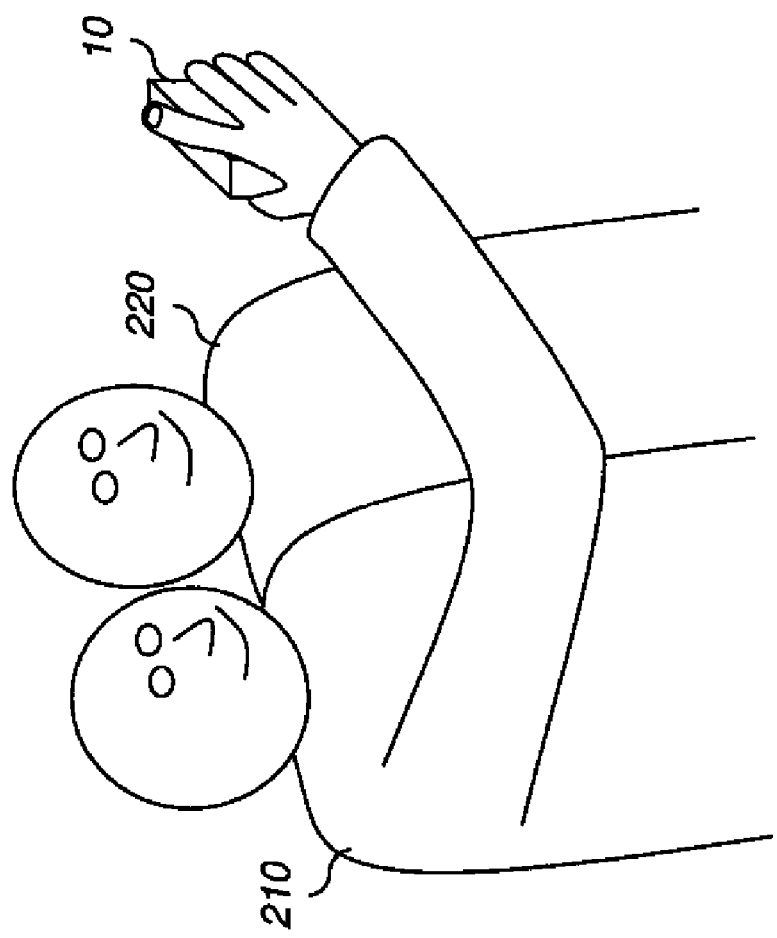
FIG. 3 illustrates a self-portrait photography scenario according to the present invention.

The present invention will now be described with reference to FIG. 3. One common usage for a digital camera 10 is for a photographer 210 to capture a self-portrait image that includes the photographer 210 by holding the digital camera 10 at arms length, pointing it back toward himself. The self-portrait image may contain only one person (i.e., the photographer 210). Alternately, the self-portrait image may optionally contain one or more additional persons 220.

According to the present invention, while the photographer 210 is adjusting the composition of the photograph, an image sensor 14 (FIG. 1) in the digital camera 10 is sensing the scene being imaged onto the image sensor by the lens 4 of the digital camera 10. A processor within the digital camera processes the output of the image sensor and performs a face detection operation to detect the presence of one or more faces in a field of view of the digital camera 10. When the processor detects the presence of at least one face in the field of view, feedback is provided to the photographer 210. The photographer 210 can then initiate capturing a digital image using a user control 34 provided for the digital camera 10.

Figure 4:
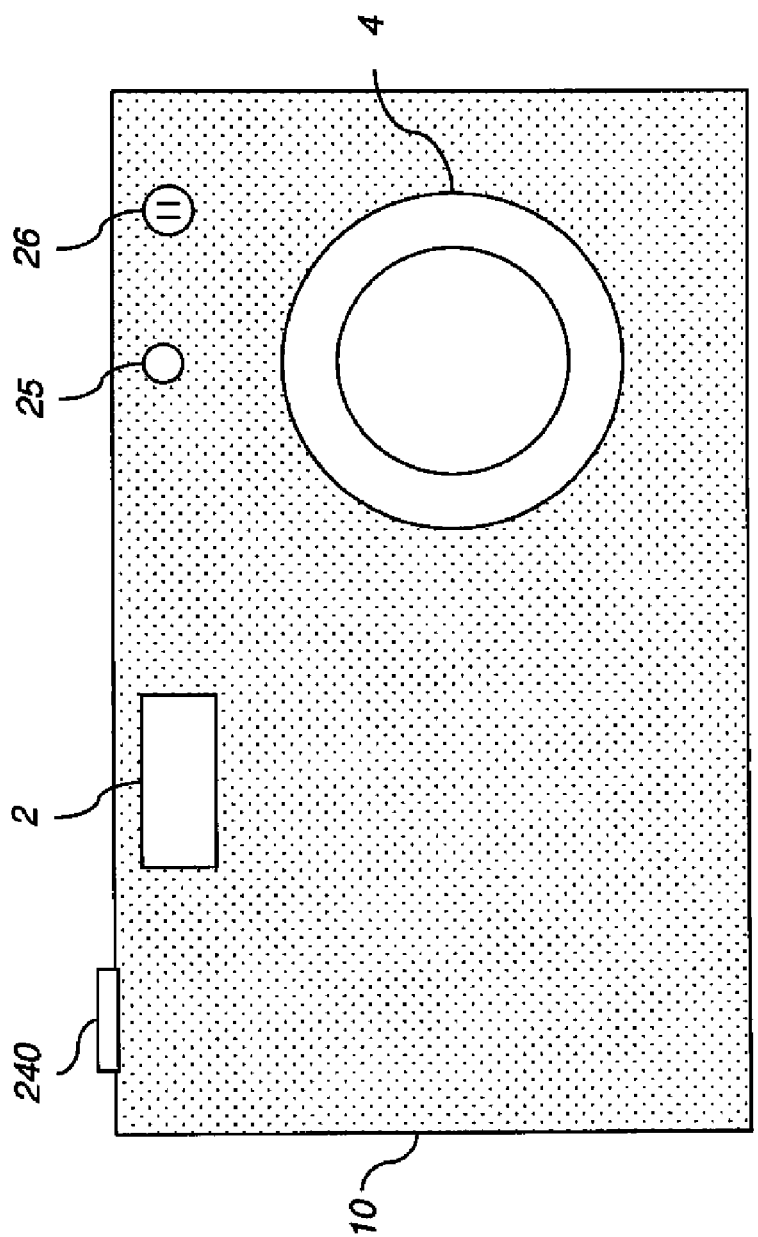
FIG. 4 is a diagram illustrating one embodiment of a digital camera for implementing the present invention.

FIG. 4 is a diagram showing additional details of a digital camera 10 incorporating the present invention. An lens 4 is provided to image a scene onto the digital sensor (not shown). The photographer 210 uses one of the user controls 34 (FIG. 1), such as image capture button 240, to initiate capture of a digital image. Various feedback mechanisms can be used to provide either visual or audio feedback to the photographer. For example, visual feedback can be provided using one or more signal lights 25 and audio feedback can be provided using speaker 26. The digital camera 10 can also provide feedback using any other feature known to one skilled in the art such as by emitting a light from flash 2, by displaying text messages or icons on a status display (not shown) on the front of the digital camera 10, or by causing tactile vibrations of some portion of the digital camera 10 using a vibratory element (not shown). The vibratory element has the advantage of reducing cost in cell phones or other devices that already have such elements for other purposes. The vibration ceases when the image is captured in order to avoid introducing motion blur in the captured image.

Optionally, other forms of user controls besides image capture button 240 can be provided to initiate capturing an image. For example, a remote control, or a voice activation mechanism using microphone 24 can all be used to initiate an image capture event. Alternatively, an existing button (not shown) which is not image capture button 240 can be repurposed to act as the "shutter button" when camera 200 is in self-portrait mode, or a secondary image capture button (not shown) can be included on the digital camera 10 and used in self-portrait mode, in order to provide a user control which can be more easily activated by the photographer 210 when the digital camera 10 is held as shown in FIG. 3. In some embodiments, a time delay is provided between when the user initiates the image capture event and when the digital image is captured, in order to reduce camera vibrations or allow the photographer time to pose.

Figure 5:
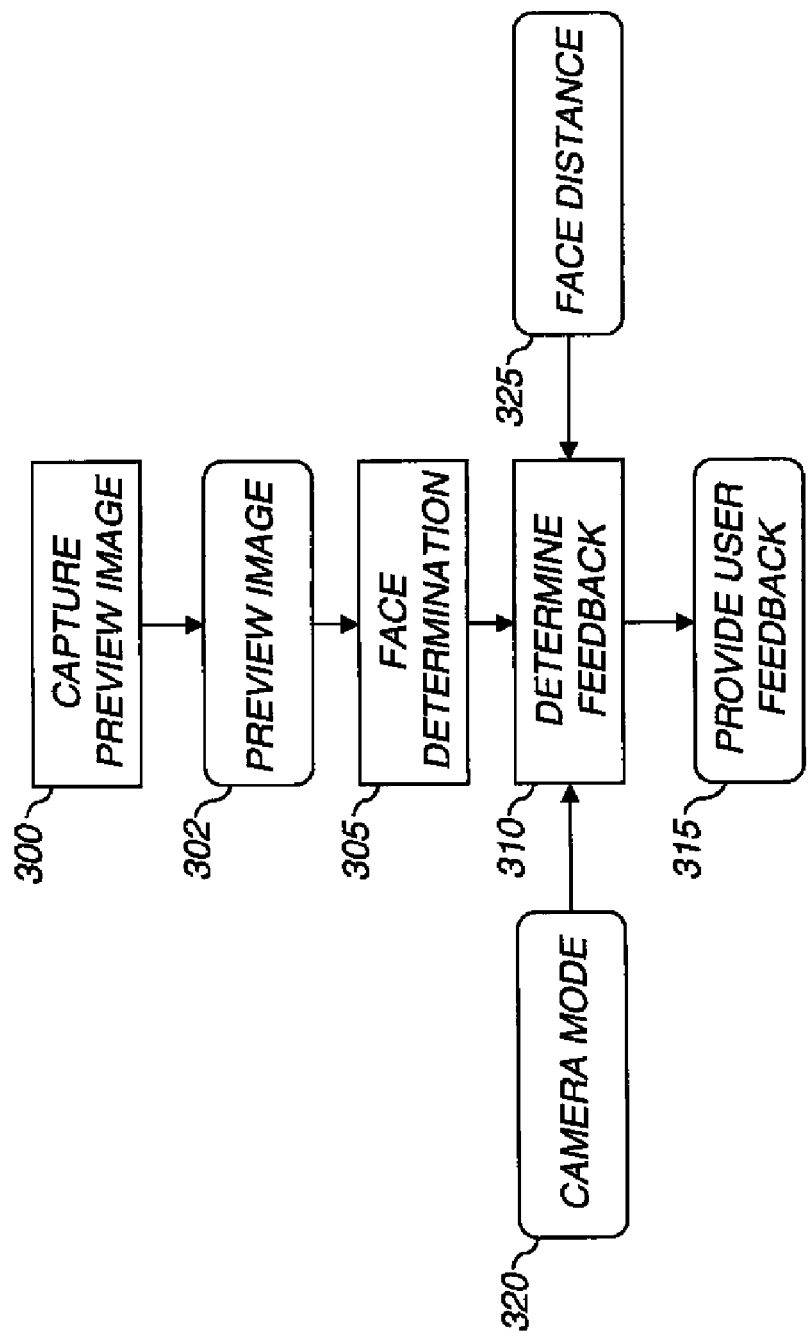
FIG. 5 is a flowchart showing steps for providing user feedback according to the present invention.

A flowchart showing steps for providing visual or audio feedback to the photographer according to the present invention is shown in FIG. 5. A capture preview image step 300 is used to capture a preview image 302 of a scene within the field of view of the lens 4 (FIG. 1 and FIG. 4) using the image sensor 14 (FIG. 1) while the digital camera 10 is operating in the first capture mode described earlier in reference to FIG. 1. The processor 20 is used to process the preview images 302 using a face determination step 305. In a preferred embodiment, the face determination step 305 determines whether the face of the photographer 210 is included in the field of view of the lens 4, by determining the number and location of any faces in the field of view. In some embodiments, this can be done by detecting whether or not at least one face of suitable size is included in the preview image 302, using face detection methods such as those described earlier with reference to the face detection/recognition step 185 of FIG. 2. In other embodiments, this can be done by further determining whether or not a detected face is the face of the photographer 210, using face recognition methods such as those described earlier in reference to the face detection/recognition step 185 of FIG. 2. The face determination step 305 can further determine whether there are multiple faces of a suitable size within the field of view of the lens 4, and whether the detected faces are positioned such that no significant portion of the face (e.g. the top portion of the head of additional person 220) is located outside of the field of view of the lens 4.

A determine feedback step 310 is used to determine appropriate user feedback 315 responsive to whether one or more faces were detected by the face determination step 305. Optionally, the user feedback 315 provided by the determine feedback step 310 may further be responsive to a camera mode 320 or a face distance 325. The camera mode 320 can be selected by the photographer using user controls 34 as described earlier in reference to FIG. 1. The face distance 325 can be the lens focus distance, provided using the through-the-lens autofocus method discussed earlier in reference to FIG. 1. There are many other auto focus mechanisms that are well-known to those skilled in the art, such as correlation autofocus methods, that can be used instead of through-the-lens autofocus, in accordance with the present invention. Alternately, the face distance 325 can be estimated from the size of the detected faces or the eye spacing relative to the overall size of the image frame together with the focal length of the lens 4.

Figure 6:
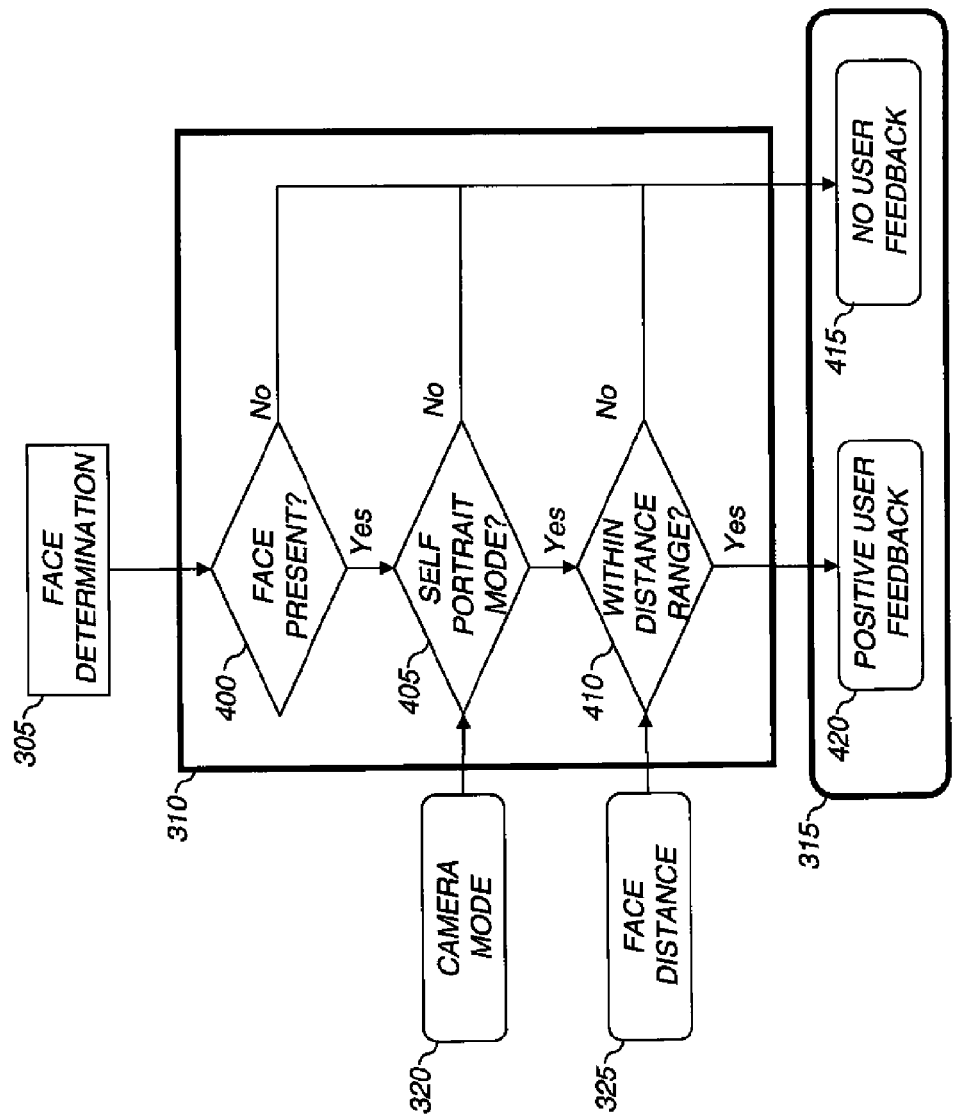
FIG. 6 is a flowchart showing additional details for the determine feedback step of FIG. 5 according to one embodiment of the present invention.

FIG. 6 is a flow-chart showing additional details for the determine feedback step 310 according to one embodiment of the present invention. The face determination step 305 provides an indication of whether at least one face is present in the field of view of the digital camera. A face present test 400 evaluates the output of the face detection step 305. If no faces are present, no user feedback 315 is provided to the user. In an alternate embodiment, negative user feedback is provided to the user rather than providing no user feedback.

If the face present test 400 determines that at least one face is present, a self-portrait mode test 405 is used to determine whether the digital camera is in a camera mode 320 where user feedback 315 regarding the presence of faces in the digital image is desired. If the camera mode 320 is not a self-portrait mode, no user feedback 415 is provided. In one embodiment of the present invention, user feedback is only provided when the camera mode 320 is set to a special self-portrait camera mode as described earlier with reference to FIG. 1. In some embodiments no self portrait mode test 405 is used and user feedback 315 is provided independent of the camera mode 320.

A within distance range test 410 determines whether the face distance 325 is within a specified face distance range. There is a finite range of face distances at which a user can hold a camera at arm's length. For the purpose of example, we will assume that distance is less than one meter. When the camera detects that the face distance is one meter or less, an assumption can be made that the user is holding the camera at arm's length. This assumption will be erroneous for the case where the digital camera is being used for macro photography. For digital cameras that support a macro photography mode, the specified face distance range can also include a minimum face distance such as 0.3 meters. If the face distance 325 is within the specified face distance range, no user feedback 415 is provided to the user. Otherwise, positive user feedback 420 is provided indicating that there is at least one face in the field of view of the digital camera.

In an alternate embodiment of the present invention, when the face distance 325 is detected to be within the specified face distance range, the camera mode 320 for the digital camera automatically switches to a self-portrait mode. This alleviates the need for the user to explicitly select a self-portrait mode with the user interface. In one variation, the user can use the user interface to indicate whether the self portrait mode should be manually or automatically selected.

The determine feedback step 310 can also incorporate other tests in accordance with the present invention. For example, a test can be added which compares a size of the detected face relative to the field of view for the camera to a specified size range that would be expected for self-portraits captured by the photographer holding the camera at arm's length. This test can be helpful to make sure that the digital camera is pointing at the photographer rather than someone in the background. In addition, different types of feedback can be provided based on whether a portion of a detected face is located outside of the field of view of the lens 4 and will be cropped when the image is captured by the digital camera 10. The feedback can be used to help guide the photographer 210 to adjust the position of the digital camera 10 in order to reduce or eliminate this cropping, by ensuring that the user is positioned within a "preferred face zone". For example, audio suggestions can be provided to "tilt camera up" or "tilt camera left." These suggestions can also be provided by providing blinking lights or by using text or icons on a status or image display (not shown) on the front of the digital camera 10, as will be described later.

There may be various camera settings appropriate for use in the self-portrait camera mode. For example, there may be a smallest practical aperture to provide a large depth of field since often, the user will use the self-portrait camera mode to capture an image of himself against a background as a record of his presence in a particular place. The small aperture and associated longer capture time may also be appropriate since in most cases, both the subject and the background will be stationary. However, the use of long exposures must be balanced versus the ability of the user to hold the camera steady. If the camera is equipped with accelerometers or some other ability to sense motion, such as motion analysis of pre-capture video, the time of capture can be automatically adjusted to occur when the camera is determined to be motionless or close to motionless. Additionally, if the camera is so equipped, the flash illumination can be controlled such that the light on the user's face is not unbalanced with that from the remainder of the scene.

Another camera setting for the self-portrait camera mode is the use of the wide angle setting when the digital camera 10 has a lens 4, which is a zoom lens rather than a fixed focal length lens. Typically, the user desires a self-portrait with the particular aspects of the location. The user's face should be recognizable, but not dominating the field of capture. In the self-portrait camera mode, the camera should generally be at the lowest magnification setting to maximize the field of view.

The user feedback 315 can be provided in many different ways in accordance with the present invention using audio or visual cues. When the digital camera is used in a video capture mode, it will generally be preferable to use a visual means of indication so that audible indications are not recorded. For example, a signal light 25, such as a light-emitting diode (LED), provided on the front of the camera can light up, or can be caused to blink, to show that the a face has been detected within the image at an appropriate face distance range while the camera is operating in the self-portrait camera mode.

In an alternate embodiment, the flash 2 can be pulsed to provide the visual feedback. This has the advantage of reducing cost by eliminating the need for an additional signal light 25. Many other visual signal means can also be used in accordance with the present invention. For example, a small image display could be used to show a low-resolution version of the captured image, however this approach will generally not be desirable because of the added cost that is associated with adding an image display to the digital camera.

The visual means of indication can also be used to provide additional information besides simply indicating that a face has been detected within the image. For example, a blink rate for the signal light 25 can be adjusted to provide an indication of the face location within the image. When the face or faces are detected within a preferred face zone in the image, the signal light 25 can be caused to blink more rapidly than when a face is detected at an edge of the image. This can enable the user to make sure that the field of view for the camera is optimally oriented.

Figure 7:
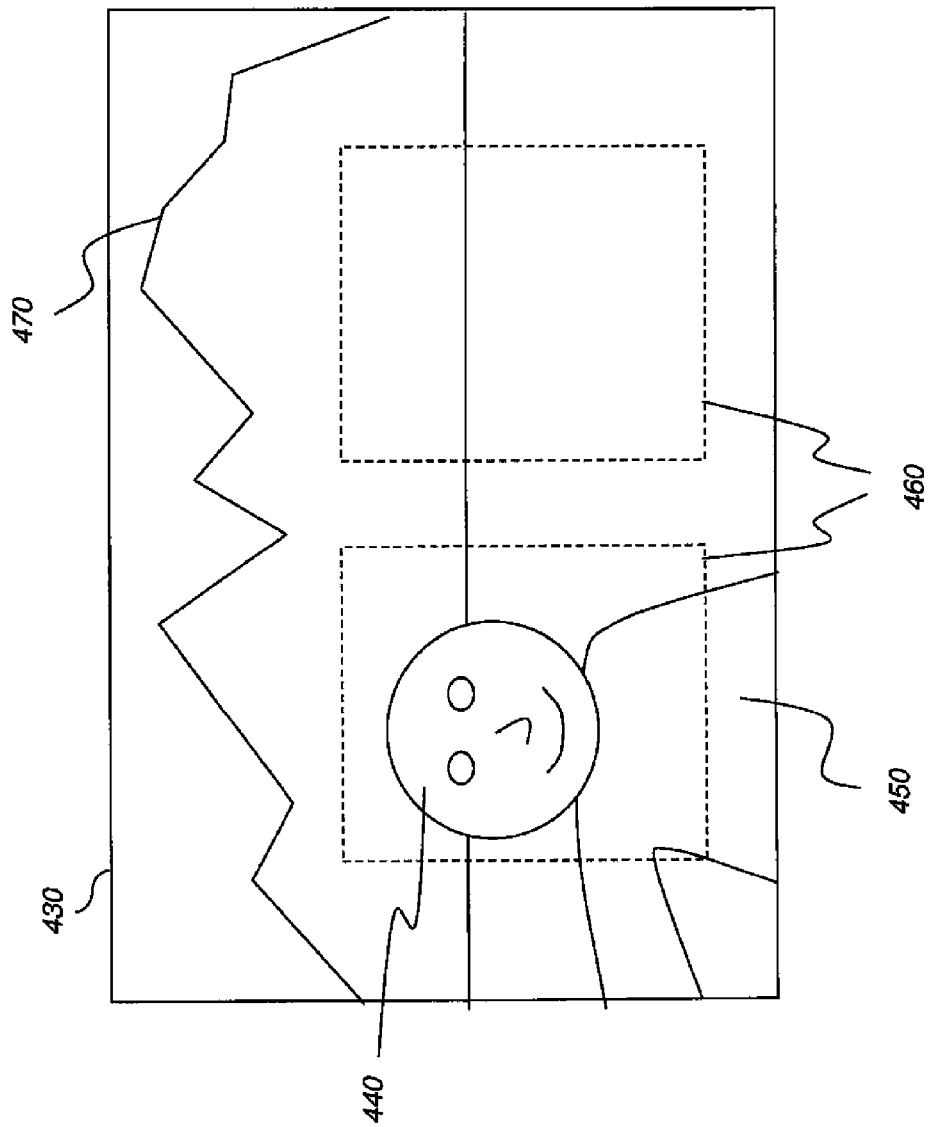
FIG. 7 illustrates example preferred face zones that are useful for applying composition rules.

The preferred face zone can be defined according to various composition rules. For example, if only one face is detected in the field of view, it will generally be desirable to position the face slightly off-center in the field of view according to the well-known "rule of thirds." This is desirable because it allows the background to be adequately represented in the captured image. This is illustrated in FIG. 7. In this example, two preferred face zones 460 are defined within the digital image 430 which correspond to aesthetically pleasing face locations. When a face 440 is detected within one of the preferred face zones 460, it can be concluded that the photographer 450 is properly positioned relative to a background 470 according to the defined composition rules, thus providing an unobscured view of the background 470. Different photographers may have different preferences for composition rules. For example, one photographer may prefer images captured using the rule of thirds, while another may prefer images captured with the face centered in the image. In one embodiment, a user interface can be provided to allow the photographer to select preferred composition rules.

It can also be desirable to use different composition rules depending on the number of faces that are detected within the image. For example, it may be desirable to use the rule of thirds when the photographer is the only person in the image. However, if two or more faces are detected in the image, it may be preferable to center the faces within the field of view. To incorporate this factor, the determine feedback step 310 (FIG. 5) can select different composition rules depending on the number of faces detected by the face detection step 305 (FIG. 5).

Other means besides changing the blink rate for the signal light 25 can be used to provide additional information. For example, a blink duty cycle, a signal light color, a signal light intensity or combinations thereof can also be used. Other embodiments would involve using multiple signal lights. For example, one light can be lit when a face is detected within the digital image 430, and a second light can be lit when the face is within a preferred face zone 460.

Figure 8:
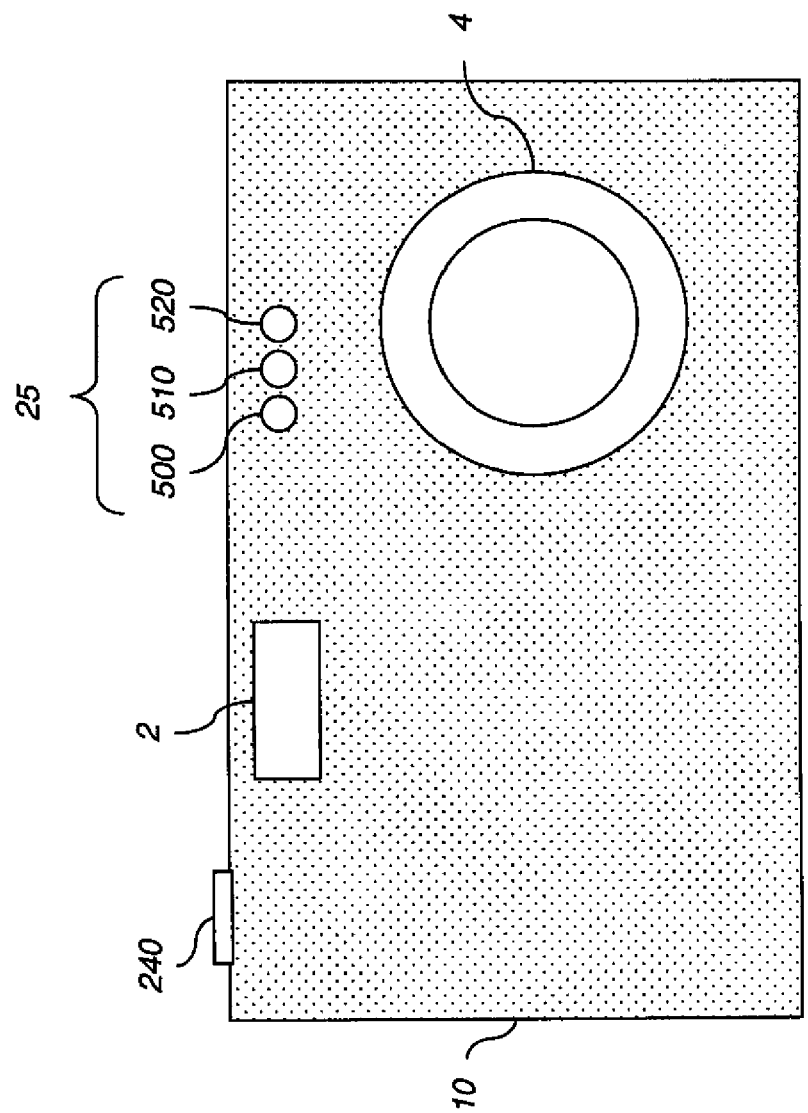
FIG. 8 is a diagram illustrating an alternate embodiment of a digital camera for implementing the present invention using multiple signal lights.

The user feedback 315 can also be used to provide an indication of what the photographer must do to improve the composition. For example, three signal lights can be provided in a row as shown in FIG. 8: a left signal light 500, a center signal light 510 and a right signal light 520. When a face is detected within a preferred face zone 460 (FIG. 7), the center signal light 510 can be lit. But when a face is detected outside of the preferred face zone 460, the other signal lights can provide an indication of what direction the user should move the camera to correct the composition. If the photographer needs to reorient the camera to the left, the left signal light 500 can be lit, and if the photographer needs to reorient the camera to the right, the right signal light 520 can be lit. In another embodiment the left signal light 500 and the right signal light 520 can have an arrow shape pointing in the direction that the photographer needs to reorient the camera. Similar means could be provided to given the photographer an indication of whether the camera needs to be reoriented vertically.

The user feedback 315 can also be used to provide an indication of the number of detected faces within the field of view of the camera. This can be useful for the photographer to verify that the camera is oriented properly for group photographs. For example, if the photographer 210 is attempting to capture a photo with additional person 220 as was shown in FIG. 3, it would be useful to verify that both of the faces fall within the field of view of the camera. In one embodiment, a multiple signal light configuration like that shown in FIG. 8 can be used to provide the indication of the number of detected faces. If one face is detected, a single signal light can be lit. Similarly, if two faces are detected, two signal lights can be lit, and if three or more faces are detected, all three signal lights can be lit. In an alternate embodiment, a small alphanumeric status display can be provided and a number can be displayed showing the number of detected faces.

Various forms of audio user feedback mechanisms can also be user in accordance with the present invention. For example, audio feedback can be provided by using the speaker to provide verbal commands to the user by using voice synthesis or by playing pre-recorded voice commands. Alternately, non-verbal audio signals can be provided such as playing various tones or sounds responsive to detecting one or more faces in the digital image.

As with the visual feedback mechanisms described above, the audio feedback mechanisms can also be used to provide additional information beyond whether or not a face has been detected. For example, the speech content of verbal audio signals can be used to provide verbal instructions to the user. For example, verbal instructions can tell the user which direction the camera should be reoriented in order to move the detected faces to positions consistent with defined composition rules. Similarly, the verbal instructions could indicate the number of faces that are detected within the field of view.

When non-verbal audio signals are used, additional information can be communicated by adjusting attributes such as the frequency, volume or duty cycle of the audio signals. For example, while the photographer is orienting the digital camera, the volume of an audio feedback may be raised as the user approaches the preferred composition and stay at a particular high volume until the pointing has changed such that the user is leaving the preferred composition. Alternatively, similar feedback may be provided by means of rising and falling pitch, or by a frequency or duration of a single tone. Similarly, the patterns of the audio signals can be used to provide an indication of the number of faces that have been detected. For example, if two faces are detected, a characteristic repetitive feedback pattern can be provided such as two blinks or beeps followed by a pause. Additional faces can provide different indication patterns.

Alternately, different audio signals can be used to indicate different conditions, similar to the way cell phones can use different ring tones to indicate different communication events. In some embodiments, a user interface can be provided to enable the photographer to select preferred audio signals that are used to indicate different conditions.

In many cases, components that already exist on most digital cameras can be used to provide the user feedback without the need to add any additional components. For example, the digital camera 10 may already incorporate a speaker 26 for providing audible indicators for other reasons, such as for playing back sounds recorded by the digital camera 10 during video mode, or for indicating that image capture has taken place or for indicating error conditions. Therefore, audio feedback can be provided using the existing speaker without requiring any additional component costs. Similarly, many digital cameras also incorporate pre-existing components that can be used to provide visual indicators. For example, an LED signal light is commonly provided to indicate battery charging. In this case, it would be necessary to position the visual indicator such that it is visible from the front of the camera.

In some embodiments, the user controls 34 can be used to enable the photographer to select a preferred form of user feedback. For example, menu options can be provided in a user interface that allows the photographer to select between providing visual feedback using signal lights, audio feedback using verbal commands, or audio feedback using non-verbal signals or tactile feedback.

For cases when multiple photographers may use a particular digital camera, each photographer may have different preferred forms of user feedback. In this case, the digital camera may be configured to allow multiple sets of preference settings. In one embodiment of the present invention, the face determination step 305 can also be trained to provide an indication of the identity of the detected faces in addition to the number and location of the identified faces, as was described earlier in reference to FIG. 5. In this case, the identity of the photographer can be inferred from the identified face and the appropriate set of preference settings can be automatically selected.

The self-portrait mode can differ from conventional portraiture modes in that there are generally dual subjects of importance. For portraiture, the subject is the face and upper body of a person. The background is generally of secondary importance. In the self-portrait mode, both the face of the subject and the background are generally important, and an adequate representation of both should be obtained to attain the desired record of user presence at a location. In one embodiment, when a single face is detected in the center of the frame, the digital camera can be automatically changed to a conventional portraiture mode and an indication of this can be provided to the user by any appropriate user feedback mechanism.

In one embodiment, selection of the self-portrait mode may provide an image capture process where image capture occurs only after specific criteria are met. For example, the user may manually select the self-portrait mode using user controls 34 on the back of the digital camera 10 with the lens 4 pointed away from the photographer 210. Once the self-portrait mode has been entered, the digital camera 10 captures preview images 302 and processes these preview images 302 until a set of criteria are satisfied. In addition to the criteria described with reference to FIG. 6, other criteria that could be evaluated would include waiting until all eyes are open, all faces are smiling and camera motion is minimized. The camera can use the aforementioned indicators to alert the photographer 210 that the criteria have been met so that image capture can be manually initiated by the photographer 210. Alternatively, the digital camera 10 can be configured so that image capture is automatically initiated when all of the criteria have been met. An advantage of providing such an automatic capture mode is that the photographer 210 need not press the image capture button 240, which can be awkward, and may impart undesirable motion to the digital camera 10 during capture.

In an alternate embodiment, the portion of the image that is not the face or body of the photographer can be analyzed to provide additional guidance to the photographer as to how the composition of the photograph should be adjusted. For example, even if the face is located within a preferred face zone 460 (FIG. 7), the digital camera may be pointing such that the background is the sky rather than the background of interest. In this case, if the background were determined to have little detail or be largely the color of blue sky, the verbal commands could be provide to the photographer to raise their arm to a higher position in order to change the viewing angle for the camera. The opposite feedback could be provided if it is determined that there is an inadequate sky region in the image.

It may be desirable to provide a calibration process for the self-portrait mode. In particular, when the image capture device is used by a single user, there will be only a very specific distance range at which self-portrait mode will be valid, since for any given user, the variation in distances at which that user can hold the capture device is relatively small. Thus when the capture device detects a face distance within that small range of distances, it can be configured to automatically enter the self-portrait mode. The calibration process can be selected by the user or can be initiated during first power up so that the appropriate measurements are taken by the capture device and stored for future reference. In some embodiments, this calibration process can be used to train the digital camera 10 to recognize the face of the photographer 210, so that the self-portrait mode is entered only when the face determination step 305 recognizes the face of the photographer 210 in the preview image 302 captured in capture preview image step 300.

In some embodiments, the face detection step 305 (FIG. 5) is adapted to detect animal faces as well as human faces. This can be useful for cases where the photographer may desire to capture a photograph of himself with a favorite pet, or some other animal.

In some embodiments, the photographer 210 uses the digital camera 10 of the present invention to capture digital still images. In other embodiments, the digital camera 10 of the present invention is a digital video camera, or is a digital still camera that also incorporates a video capture mode (i.e. "movie mode"). When the present invention is used in the process of capturing digital video images, it will generally be desirable for the user feedback be provided continuously in order to allow the user to maintain appropriate composition during the video capture process, and to be provided using visual feedback, rather than audio or tactile feedback.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
25 signal lights
26 speaker
28 firmware memory
30 image memory
32 image display
34 user controls
36 display memory
38 wired interface
40 computer
42 auxiliary sensor
44 video interface
46 video display
48 interface/recharger
50 wireless modem
52 radio frequency band
58 wireless network
70 Internet
72 photo service provider
100 color sensor data
105 sensor noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 user settings
180 digital image file
185 face detection/recognition step
210 photographer
220 additional person
240 image capture button
300 capture preview image step
302 preview image
305 face determination step
310 determine feedback step
315 user feedback
320 camera mode
325 face distance
400 face present test
405 self portrait mode test
410 within distance range test
415 no user feedback
420 positive user feedback
430 digital image
440 face
450 photographer
460 preferred face zone
470 background
500 left signal light
510 center signal light
520 right signal light

What is claimed is:

1. A device comprising:
an image sensor, wherein the device is configured to capture images;
a processor configured to process a preview image from the image sensor in order to detect a presence of one or more faces in a preferred face zone within a field of view of the device; and a plurality of visual means of indication configured to provide feedback responsive to detecting a face in the preferred face zone, wherein the plurality of visual means of indication only provides feedback during a self-portrait mode of the device and in response to a distance between the device and the detected face being within a specified range of distances, and wherein the specified range of distances comprises a stored range of distances at which a photographer can hold the device at arm's length, wherein the plurality of visual means of indication are arranged to provide visual feedback on how to move the device, including a center light to indicate presence of the one or more faces in the preferred face zone and directional lights to indicate what direction to move the device to better position the one or more faces in the preferred face zone.

2. The device of claim 1, wherein the preferred face zone comprises a middle of the field of view of the device.

3. The device of claim 1, wherein the preferred face zone comprises a portion within a predetermined margin of the field of view of the device.

4. The device of claim 1, wherein the feedback comprises an indication of a number of faces detected within the preferred face zone.

5. The device of claim 1, wherein the plurality of visual means of indication include left and right directional lights to indicate a direction that the device should be reoriented to provide an improved field of view.

6. The device of claim 5, wherein the directional lights have an arrow shape pointing a direction to move the device to provide an improved field of view.

7. The device of claim 5, wherein the directional lights include left, right, up and down signal lights.

8. The device of claim 1, further comprising a user interface control configured to enable selection between at least a first mode in which the feedback is provided and a second mode in which no feedback is provided.

9. The device of claim 1, further comprising control configured to enable selective selection of a type of feedback to be provided by the feedback mechanism.

10. The device of claim 1, wherein the preferred face zone is positioned based on current background content within the field of view.

11. A method comprising:
processing, by a processor, an output of an image sensor of a device configured to capture images in order to detect a presence of one or more faces in a preferred face zone within a field of view of the device; and
providing feedback, by a plurality of visual means of indication, responsive to detecting a face in the preferred face zone, wherein the plurality of visual means of indication only provides feedback during a self-portrait mode of the device and in response to a distance between the device and the detected face being within a specified range of distances, and wherein the specified range of distances comprises a stored range of distances at which a photographer can hold the device at arm's length, wherein the plurality of visual means of indication are arranged to provide visual feedback on how to move the device, including a center light to indicate presence of the one or more faces in the preferred face zone and directional lights to indicate what direction to move the device to better position the one or more faces in the preferred face zone.

12. The method of claim 11, wherein the preferred face zone comprises a middle of the field of view of the device.

13. The method of claim 11, wherein the preferred face zone comprises a portion within a predetermined margin of the field of view of the device.

14. The method of claim 11, wherein the preferred face zone is positioned based on current background content within the field of view.

15. The method of claim 11, further comprising receiving a selection from a user interface control configured to enable selection between at least a first mode in which the feedback is provided and a second mode in which no feedback is provided.

16. The method of claim 11, wherein the directional lights include left, right, up and down directional visual means of indication to indicate a direction that the device should be reoriented to provide an improved field of view.

17. A non-transitory computer-readable medium having instructions stored thereon that, upon execution, cause a computer device to perform operations comprising:
processing an output of an image sensor of a device configured to capture images in order to detect a presence of one or more faces in a preferred face zone within a field of view of the device; and
providing feedback, via a plurality of visual means of indication, responsive to detecting a face in the preferred face zone, wherein the plurality of visual means of indication is only provided during a self-portrait mode of the device and in response to a distance between the device and the detected face being within a specified range of distances, and wherein the specified range of distances comprises a stored range of distances at which a photographer can hold the device at arm's length, wherein the plurality of visual means of indication are arranged to provide visual feedback on how to move the device, including a center light to indicate presence of the one or more faces in the preferred face zone and directional lights to indicate what direction to move the device to better position the one or more faces in the preferred face zone.

18. The non-transitory computer-readable medium of claim 17, wherein the preferred face zone comprises a middle of the field of view of the device.

19. The non-transitory computer-readable medium of claim 17, wherein the preferred face zone comprises a portion within a predetermined margin of the field of view of the device.

20. The non-transitory computer-readable medium of claim 17, wherein the directional lights include left, right, up and down directional signal lights to indicate a direction that the device should be reoriented to provide an improved field of view.

* * * * *